United States Patent
Gyger et al.

(10) Patent No.: US 10,515,277 B2
(45) Date of Patent: Dec. 24, 2019

(54) METHOD FOR ANALYZING THE DISTRIBUTION OF OBJECTS IN FREE QUEUES

(71) Applicant: Xovis AG, Zollikofen (CH)

(72) Inventors: Cyrill Gyger, Frick (CH); Markus Herrli Anderegg, Allmendingen (CH); David Studer, Bruegg (CH)

(73) Assignee: XOVIS AG, Zollikofen (CH)

( * ) Notice: Subject to any disclaimer, the term of this patent is extended or adjusted under 35 U.S.C. 154(b) by 162 days.

(21) Appl. No.: 15/021,320

(22) PCT Filed: Sep. 11, 2014

(86) PCT No.: PCT/CH2014/000129
§ 371 (c)(1),
(2) Date: Mar. 11, 2016

(87) PCT Pub. No.: WO2015/035525
PCT Pub. Date: Mar. 19, 2015

(65) Prior Publication Data
US 2016/0224844 A1    Aug. 4, 2016

(30) Foreign Application Priority Data
Sep. 13, 2013    (EP) .................................. 13405111

(51) Int. Cl.
*H04N 7/18* (2006.01)
*G06K 9/00* (2006.01)
*G06T 7/20* (2017.01)

(52) U.S. Cl.
CPC ............. *G06K 9/00778* (2013.01); *G06T 7/20* (2013.01); *G06T 2207/30242* (2013.01)

(58) Field of Classification Search
CPC .......... G06K 9/00778; G06T 7/70; G06T 7/20
(Continued)

(56) References Cited

U.S. PATENT DOCUMENTS 5,097,328 A * 3/1992 Boyette .................. G06Q 10/06
348/150
5,953,055 A    9/1999 Huang et al.
(Continued)

FOREIGN PATENT DOCUMENTS

WO    WO 2005/055692 A2    6/2005
WO    WO 2011/020641 A1    2/2011

OTHER PUBLICATIONS

Cheriyadat et al. "Detecting Dominant Motions in Dense Crowds", IEEE Journal of Selected Topics in Signal Processing, IEEE, US, vol. 2, No. 4, Aug. 2008, pp. 568-581.
(Continued)

*Primary Examiner* — Helen Shibru
(74) *Attorney, Agent, or Firm* — Birch, Stewart, Kolasch & Birch, LLP

(57) ABSTRACT

In a method for analyzing the distribution of objects in a free queue, proceeding from position information, firstly a monitoring region comprising the free queue is subdivided into a plurality of positions. Proceeding from the position information, objects assigned to the free queue are identified. Said objects are subsequently tracked. At least for a portion of the identified objects, a current waiting time in the free queue is tracked. At least for a portion of the positions of the monitoring region, the current waiting time of one or a plurality of the identified objects situated at the corresponding positions is assigned. Furthermore, the positions with assigned waiting times are classified into a plurality of classes, wherein each of the classes corresponds to a continuous waiting time range.

14 Claims, 5 Drawing Sheets

(58) Field of Classification Search
USPC .......................................................... 348/143
See application file for complete search history.

(56) References Cited

U.S. PATENT DOCUMENTS

| | | | | |
|---|---|---|---|---|
| 8,131,010 | B2* | 3/2012 | Senior | G06K 9/00778 |
| | | | | 348/149 |
| 8,832,261 | B1* | 9/2014 | Ybarra, III | H04L 41/5016 |
| | | | | 709/224 |
| 8,924,868 | B2* | 12/2014 | Hammoud | G06Q 30/00 |
| | | | | 715/761 |
| 9,317,842 | B2* | 4/2016 | Freedman | G06Q 20/1085 |
| 9,549,156 | B2* | 1/2017 | Freedman | G06Q 20/1085 |
| 10,423,838 | B2* | 9/2019 | Gyger | G06T 7/20 |
| 2003/0036936 | A1* | 2/2003 | Steichen | G06Q 10/0639 |
| | | | | 705/7.38 |
| 2003/0107649 | A1 | 6/2003 | Flickner et al. | |
| 2004/0036712 | A1* | 2/2004 | Cardno | G06Q 30/02 |
| | | | | 715/705 |
| 2005/0117778 | A1 | 6/2005 | Crabtree | |
| 2009/0034846 | A1 | 2/2009 | Senior et al. | |
| 2009/0222388 | A1 | 9/2009 | Hua et al. | |
| 2012/0207350 | A1 | 8/2012 | Loos et al. | |
| 2013/0027561 | A1* | 1/2013 | Lee | G06Q 30/02 |
| | | | | 348/150 |
| 2015/0324647 | A1* | 11/2015 | Wuethrich | G06K 9/00771 |
| | | | | 382/103 |

OTHER PUBLICATIONS

Haritaoglu et al. "Detection and Tracking of Shopping Groups in Stores", Proceedings of the 2001 IEEE Computer Society Conference on Computer Vision and Pattern Recognition, 2001, vol. 1, Dec. 8-14, 2001, pp. I-431-I-438.

Nam, Yunyoung "Crowd flux analysis and abnormal event detection in unstructured and structured scenes", Multimedia Tools and Applications, vol. 72, No. 3, Oct. 2014, pp. 3001-3029.

Parameswaran et al. "Design and Validation of a System for People Queue Statistics Estimation", Video Analytics for Business Intelligence, vol. 409, Jan. 2012, pp. 355-373.

Simon Bang Jacobsen, "Queue Assessment via Images", Dec. 31, 2012, XP055600789, URL:http://www2.imm.dtu.dk/pubdb/views/edoc_download.php/6415/pdf/imm6415.pdf (Jun. 28, 2019).

* cited by examiner

METHOD FOR ANALYZING THE DISTRIBUTION OF OBJECTS IN FREE QUEUES

TECHNICAL FIELD

The invention relates to a method for analyzing the distribution of objects in a free queue.

PRIOR ART

In the field of monitoring persons for the purpose of counting, passenger flow control, process optimization, behavioral analysis, etc. it is often desirable to determine and measure waiting persons. In this regard, there is interest in establishing for example how long a person had to wait to be dealt with and how long persons are expected to have to wait if they are just beginning to queue to be dealt with. Therefore, there is a need, in particular, to be able to identify queues that are forming and to be able to analyze over time the persons who are considered to be part of said queue.

Queues often form spontaneously. The shape of a queue can be predefined by so-called lining, which channels the waiting persons and thereby defines a fixedly predefined region for those waiting. If such lining is absent or the lining does not unambiguously define the arrangement of the persons in the queue, the shape of the queue forms in an unforeseeable way, however. Queuing in front of an automatic ticket machine shall be mentioned here as an example: at places where until recently persons still passed through, a queue can suddenly form, with the result that the persons passing by have to take a different route. If the queue becomes longer, its shape can change spontaneously, for example on account of prevailing structural obstacles (walls, columns, streets, etc.).

Such queues are referred to hereinafter as "free queues". They are understood to mean in the present case a queue whose members are situated in a substantially continuous zone and whose end position (location of a counter, an automatic machine, a way through, etc.) is known, but not the position of the beginning of the queue and the shape of the queue within a genuinely two-dimensional zone.

If the identification and analysis of the queue are intended to be carried out in an automated manner, for example on the basis of image information captured by suitable image sensors, the following challenges arise in the case of free queues:

The beginning of the queue, that is to say the location or the zone where new persons waiting form a queue, is not known.

The shape and movement (change) of the queue are not known.

Persons who do not belong to the queue (e.g. pass through the queue) can be situated in the region of the queue.

The positions of persons which are provided by suitable sensors, for example sensors for generating image information or generally position information, and form the basis of an evaluation are not always free of errors.

There are persons who jostle or fall back and thus falsify the overall picture of the queue.

Methods for the automated analysis of queues on the basis of position information are known from the prior art.

U.S. Pat. No. 5,953,055 (NCR Corp.) describes a system and method for detecting, collecting information about, and analyzing a queue on the basis of a sequence of video images. In particular, movement patterns, the number of persons in the queue and the average waiting time are determined. Two different algorithms are proposed for "structured" and "unstructured" queues; structured queues are those which are substantially straight and are positioned at a predefined location; unstructured queues form when customers are called to a service point and wait whilst being seated, for example. Both algorithms involve firstly determining a difference between successive video images in order to delimit objects from the background on the basis of their movement. The value 1 is assigned to pixels in which objects are situated. In the context of the first, pixel-based algorithm, the number of persons in the queue is then determined by subdividing the region of the queue into vertical slots each corresponding approximately to the extent of a waiting person. In the context of the second, segment-based algorithm, adjacent pixels corresponding to the same object are identified and assigned to the object. The number of persons in a queue can be ascertained therefrom. The waiting time in a queue is determined on the basis of logged events, namely joining or leaving the queue.

The pixel-based method clearly functions only for ordered queues. The segment-based method can also be employed for free queues, in principle, wherein a binary mask is created which corresponds to the whereabouts of persons.

However, the segment-based method does not take account of the specific properties of free queues. Since it is designed primarily for the analysis of "unstructured" queues and in particular covers cases in which the members of the queue wait whilst being seated, the method cannot assume that those waiting are situated in a substantially continuous zone. Accordingly, knowledge about the dynamics in such queues cannot be used for determining the waiting time, and corresponding information cannot be generated either. This prevents a complete analysis of a free queue and the accurate determination of a waiting time.

U.S. Pat. No. 8,131,010 B2 (IBM) is also directed to the measurement of properties of a queue. To that end, a plurality of images of the queue are recorded, properties are extracted from the images and properties of a plurality of successive images are analyzed in order to identify correspondences. How the queue and objects therein are identified is not explained in greater detail; these steps can be carried out manually, inter alia. The waiting time can be determined, inter alia, by tracking individual objects and ascertaining their waiting time; how this tracking takes place is likewise not explained in detail; one possibility is progressive training with more and more trajectories.

The system proceeds from assumptions regarding the structure of the analyzed queue which are not provided in the case of free queues. It is therefore not suitable for the analysis of free queues.

WO 2011/020641 A1 (Robert Bosch GmbH) is directed to a device for identifying a queue of objects in a monitoring region. The objects are detected on the basis of a monitoring image. A queue is understood to mean various collections of objects queuing at one or a plurality of target locations. A subtraction of the image background is explicitly dispensed with; furthermore, content-sensitive detectors can be present. A modeling module can be present, which can be used to model the queue on the basis of the detected objects. Said module comprises, for example, a multiplicity of queue models that cover differ versions of queues. Furthermore, a movement analysis module can be present, which can identify e.g. the direction of movement of the detected objects. An assessment module can also be present, which can be used to ascertain, e.g. the average waiting time or the number of objects in the queue.

The document is highly nonspecific with regard to the analyses of the recorded image that are concretely carried out. It is not evident from this how exactly the location of the queue is identified or how a waiting time is determined. Accordingly, the device described also cannot readily be used for analyzing free queues.

WO 2005/055692 A2 (Brickstream Corp.) discloses systems and methods which make it possible to establish whether objects are situated in a queue. To that end, the position values of a plurality of objects are ascertained and compared with one another; the speed of one of the objects can be used supplementarily. The position values result from a tracking of the objects, e.g. on the basis of images from optical sensors. Free, disordered queues are also "queues" in the sense of the application. Two main approaches are disclosed for establishing whether or not objects belong to a queue:

1. A queue end position, e.g. the location of a cash register or of a service point, is identified, as well as a seed region adjoining it. The paths of objects currently situated in the seed region are subsequently identified. Undesired paths can be filtered out on the basis of various criteria. The remaining paths are then added to the queue. Further objects can be assigned to the queue if the position change thereof in a specific time interval does not exceed a certain limit value or is in a specific range. Objects can furthermore be assigned to the queue if the (scalar) speed thereof is in a specific range.
2. Remaining paths are investigated to establish whether they fulfill parameters which are fulfilled by paths already assigned to the queue. If this is the case, they are likewise assigned to the queue.

This system in principle also makes it possible to analyze free queues. However, it requires complex calculations, and difficulties in evaluation arise depending on the dynamics of the object movements in the free queue.

SUMMARY OF THE INVENTION

The problem addressed by the invention is that of providing methods for analyzing the distribution of objects in a free queue, which methods are associated with the technical field mentioned in the introduction, enable an efficient analysis of free queues and can yield precise results.

The solution to the problem is defined by the features of claim 1. According to the invention, a method for analyzing the distribution of objects in a free queue, proceeding from position information, comprises the following steps:
a) subdividing a monitoring region comprising the free queue into a plurality of positions;
b) proceeding from the position information, identifying objects assigned to the free queue;
c) tracking the identified objects;
d) at least for a portion of the identified objects, tracking a current waiting time in the free queue;
e) at least for a portion of the positions of the monitoring region, assigning the current waiting time of one or a plurality of the identified objects situated at the corresponding positions; and
f) classifying the positions with assigned waiting times into a plurality of classes, wherein each of the classes corresponds to a continuous waiting time range.

The method is suitable in particular for analyzing queues formed by persons. In principle, however, it is also suitable for free accumulations of other "waiting" objects, e.g. animals in front of an entrance, articles in a funnel region in front of a passage, etc. The method is likewise suitable for analyzing queues whose course is wholly or partly predefined by lining, but for which the arrangement of the lining is not fixed, but rather is changed over during operation. With the aid of the method according to the invention, such queues can readily be taken into account, without changes to the lining explicitly having to influence the evaluation. Since the arrangement of the lining does not need to be known and the entire possible waiting region is monitored, such queues having variable lining can also be regarded and treated as "free queues" within the meaning of the invention.

The position information is image information, in particular. The image information is generally present in rasterized form, i.e. as a certain number of pixels having a certain brightness value and/or color value. The term "position" used here always relates to a certain region of physical space, that is to say an area region in the two-dimensional analysis of a queue or a spatial region in the three-dimensional analysis of a queue. The region can correspond in particular to a certain number of pixels of the image information (e.g. in each case 1 pixel, 2×2 pixels, etc.), wherein not all regions need be of the same size. Accordingly, an object "is situated" at a specific position if the object covers the area region or fills the spatial region. An object can thus in principle be situated simultaneously at a plurality of (adjacent) positions.

The waiting time need not necessarily be tracked for all objects of the free queue. Specifically, it is possible to differentiate between "certainly identified" (validated) objects and "uncertain" objects in the monitoring region, wherein for the latter it is not yet (or no longer) certain whether they actually belong to the queue.

In the method according to the invention, therefore, a binning of the waiting times is performed, i.e. positions having a similar waiting time are grouped. As a result, a "map" is created for the free queue, said map representing individual sub-regions in an ascending manner in a mosaic-like manner along the direction of the queue. A robust neighborhood definition with respect to any arbitrary region within the free queue thus becomes possible. The binning thus provides a stable basis for the more extensive analysis of the free queue.

Preferably, waiting times of a plurality of persons situated at a specific position during a monitoring time period are averaged before the positions are classified into classes. This produces stable and homogeneous results. The averaging can involve e.g. the formation of a mean value (arithmetic, geometric mean, etc.) or a median value. The waiting times can be incorporated in the averaging in weighted manner, e.g. by virtue of values nearer in time being weighted more highly than earlier values further away in time.

Waiting times of those persons who were situated at the specific position during a predefinable period of time before an evaluation point in time can be taken into account for the averaging.

Alternatively or additionally, waiting times of a predefinable number of persons who were last situated at the specific position can be taken into account for the averaging. Particularly preferably, the criteria are combined, i.e. the waiting times of a predefined maximum number of persons have an influence, in which case, however, the persons taken into account are only those who were not situated at the corresponding position for longer than before a predefined maximum period of time. This ensures that the averaged waiting times represent the current situation.

Preferably, positions of a non-empty class to which the shortest waiting time is assigned are defined as the start of the free queue. In this way, on the basis of the neighborhood information ascertained by the binning, a representative waiting time can be allocated to a person joining the queue.

Advantageously, the method according to the invention comprises the following additional steps:
g) assigning newly identified objects to a first object group;
h) for each of the objects of the first object group, storing a sequence of positions of the object with assigned waiting times;
i) for all objects of the first object group, periodically checking whether they satisfy a validity criterion;
j) assigning all checked objects that satisfy the validity criterion to a second object group and adding at least a portion of the sequence stored for these objects to the waiting times assigned to the positions in step e),
wherein an assignment of the current waiting time in accordance with step e) mentioned above is carried out only for the objects in the second object group.

This ensures, on the one hand, that information of newly identified objects in the monitoring region influences the analysis only if it has been found that the objects (with a certain probability) belong to the queue. On the other hand, the data already collected for these objects before this ascertainment are not lost, rather they are added (retrospectively), after validation has taken place, to the data of the further validated objects. The addition can be restricted to a portion of the data, in particular data from a predefined time interval before the addition point in time.

For determining the spatial extent of a free queue, proceeding from position information, the method advantageously comprises the following steps:
a) subdividing a monitoring region comprising the free queue into a plurality of positions;
b) proceeding from the position information, identifying objects assigned to the free queue;
c) tracking the identified objects;
d) periodically storing a current position of at least a portion of the tracked objects;
e) determining an average speed of at least a portion of the objects, wherein the average speed of an object is determined on the basis of a plurality of the stored positions of the respective object;
f) depending on the average speeds determined, creating a first map, which records, in relation to the positions in the monitoring region, an appearance density of objects at the corresponding positions,
g) proceeding from a predefined exit region of the free queue, carrying out a flood fill method for generating a continuous region corresponding to the extent of the free queue, wherein the first map is used for a validity check.

This sequence of method steps, too, is suitable particularly for analyzing queues formed by persons. In principle, however, it is also suitable for free accumulations of other "waiting" objects, e.g. animals in front of an entrance, articles in a funnel region in front of a passage, etc.

Here, too, image information is processed, in particular, which is present in rastorized form, i.e. as a certain number of pixels having a certain brightness value and/or color value. The term "position" used here always relates to a certain region of physical space, that is to say an area region in the two-dimensional analysis of a queue or a spatial region in the three-dimensional analysis of a queue. The region can correspond in particular to a certain number of pixels of the image information (e.g. in each case 1 pixel, 2×2 pixels, etc.), wherein not all regions need be of the same size. Accordingly, an object "is situated" at a specific position if the object covers the area region or fills the spatial region. An object can thus in principle be situated simultaneously at a plurality of (adjacent) positions.

The average speed of an object is determined on the basis of the temporal profile of the object position. In the simplest case, the last two object positions stored are used and the spatial distance is divided by the temporal distance of the recording of the corresponding items of position information. The robustness of the result obtained can be improved if additional object positions are used. The speed can then be represented by an averaged value, for example, wherein the individual object positions can also be weighted to different extents (e.g. earlier positions with lower weight than recently determined positions).

The first map is an assignment between area or spatial regions and the presence probabilities of objects situated there. By taking account of the speeds ascertained, it is possible to filter out in particular objects which move too rapidly to be able to be part of the queue (e.g. persons who move past a queue in proximity thereto or pass through said queue). The criterion can be represented by a threshold value, wherein objects are taken into account as member of the queue only if the speed thereof does not exceed the threshold value. The average speed can be a scalar quantity; if the average speed is determined vectorially, i.e. with direction information, the direction can also be used as a criterion for creating the first map. In this regard, objects moving substantially counter or transversely with respect to the main direction of movement in the queue are probably likewise not associated with the queue. Accordingly, it is possible to take account of, for example, only objects whose direction is in a specific angular range relative to a main direction of movement of the queue or whose speed magnitude does not exceed a certain minimum value (i.e. persons substantially standing still).

The resolution of the first map can correspond to that of the positions, i.e. a field in the first map is assigned to each position considered. However, the map can also have a different, in particular a coarser, resolution. In this regard it is possible, for example, to assign in each case a plurality of positions to the same field in the first map.

The exit region involves one or a plurality of positions or one or a plurality of fields in the first map which represent the target of those waiting, i.e. a counter, an automatic machine, a way through, etc. The exit region can be defined by a crossing line, for example.

Flood fill methods are known in principle from digital image processing. Proceeding from a pixel (in the present case from a field in the first map), the respectively adjacent pixels or fields are tested to establish whether they satisfy a specific criterion (in the present case: whether the field has a certain appearance density). If so, these fields are added to the field set. Depending on the geometry of the fields, a different number of neighbors can be taken into account, in the case of square fields in the plane e.g. four neighbors or eight neighbors (including diagonally adjacent fields).

The described sequence of method steps enables a simple and efficient identification of the extent of the free queue as a "filled region".

Advantageously, objects having an average speed outside a predefined range are not taken into account when creating the first map. Particularly objects whose speed is higher than a certain limit value of the order of magnitude of the speed of movement in the queue probably do not form part of the queue, but rather move past it or through it. Therefore, they ought not to be taken into account in the analysis of the queue, in order not to falsify it. The limit value can be fixedly predefined on the basis of empirical values, or it is determined dynamically on the basis of the average speeds ascertained, for example by the average or median speed being multiplied by a factor.

In one preferred embodiment of the method for determining the spatial extent of the free queue, the following further steps are performed:

h) determining a direction vector of at least a portion of the objects, wherein the direction vector of an object is determined on the basis of a plurality of the stored positions of the respective objects;
i) creating a second map, which records the determined direction vectors of the objects in relation to the positions in the monitoring region;
j) for each field of the second map, ascertaining an average direction vector;
k) on the basis of the ascertained average direction vectors, identifying frequent trajectories during a predefined past period;
l) for at least some of the identified frequent trajectories, supplementing information in the first map, concerning the appearance density of objects at positions which are associated with the trajectories.

The inclusion of the direction of movement enables a refined analysis of the free queue. The fields of the second map can correspond to the positions of the first map. This is not mandatory, however; the resolution and/or division of the monitoring region can be different in the second map than in the first map. A trajectory is identified as frequent, for example, if, in a predefined number of fields, the average direction vectors ascertained deviate from one another by not more than a predefined angular distance. Fields which correspond to positions having a low average speed below a lower limit value can be excluded from the analysis in order that direction vectors which were ascertained on the basis of random movements do not corrupt the result.

Advantageously, a stop mask comprising positions without activity is generated proceeding from the first map, and the stop mask is used for the validity check in the flood fill method. As a result, stationary objects, e.g. articles situated in the monitoring region, are excluded from the analysis. The analysis is simplified and falsifications are prevented.

Preferably, the first map is smoothed before the flood fill method is carried out, in particular by Gaussian filtering. Artifacts from image acquisition and processing can thus be eliminated in a simple manner. The smoothing prevents an artificial formation of "islands" only on account of artifacts.

The smoothing need not necessarily be performed here, particularly if the raster underlying the first map has a certain raster width, such that small-scale fluctuations are largely averaged out already when the first map is created.

Preferably, the flood fill method is carried out for all positions of the exit region, such that a plurality of continuous regions can be generated, and a region having the largest area is selected as the extent of the free queue. This ensures that the free queue is completely detected, irrespective of where exactly the target of those waiting in the queue is located. In order to increase the process efficiency, positions of the exit region that have been reached by a flood fill method that has already been carried out can be omitted as starting points for further flood fill methods since these cannot yield any new or other regions.

Advantageously, the continuous region is processed further by at least one morphological operation, in particular by one or a plurality of the following processes:
 filling isolated holes in a continuous region;
 dilatation;
 closing.

As a result, the extent of the free queue arises as a region whose properties largely correspond to those of usually occurring regions of free queues, since the latter generally have neither isolated holes nor continuous separating locations. It can thus be seen that such features usually represent artifacts from data processing. The artifacts are eliminated by the operations mentioned. Each of the operations can also be carried out repeatedly; by way of example, it is possible to perform the three steps in the abovementioned sequence and finally once again a filling step for filling isolated holes.

Preferably, in the context of the method, a characteristic figure is generated for a movement in the free queue. If said characteristic figure indicates a small movement, the continuous region ascertained is combined with a continuous region ascertained at an earlier point in time. In the case of small movement, gaps in the first map are likely and the flood fill process would accordingly yield only a segment of the queue. Combination with the region ascertained earlier ensures that the entire extent is detected even in such cases.

As soon as an ascertained queue is present, the characteristic figure can be ascertained as follows, for example, in the context of creating the first map:

1. Per person and per field covered by said person, a first counter is incremented if the person is situated in the queue.
2. Per person and per field covered by said person, a second counter is incremented if the person had not already occupied the current position thereof once, under the assumption that the person is situated in the queue.

Steps 1 and 2 are added up over a period. At the end of the period, the characteristic figure is then formed as a ratio between second counter and first counter. A high value thus indicates a large movement within the queue.

Other methods for ascertaining the characteristic figure are possible. The combination with regions ascertained earlier can additionally be based on other criteria and be carried out e.g. in the case of an abrupt decrease in the area of the continuous region. (However, it should be taken into account here that such an abrupt decrease can take place in practice, e.g. if a new exit region is produced, e.g. by the opening of an additional counter or way through.)

The described method for determining the spatial extent of a free queue can be used in particular in the context of the method according to the invention, as described initially, for analyzing the distribution of objects in a free queue on the basis of classified waiting times, namely as a first step before the analysis is performed. However, it can also be used independently thereof or in combination with other methods for analyzing the objects in the queue.

Further advantageous embodiments and feature combinations of the invention are evident from the following detailed description and the totality of the patent claims.

BRIEF DESCRIPTION OF THE DRAWINGS

In the drawings used for explaining the exemplary embodiment.

In principle, identical parts are provided with identical reference signs in the figures.

WAYS OF EMBODYING THE INVENTION

Figure 1:
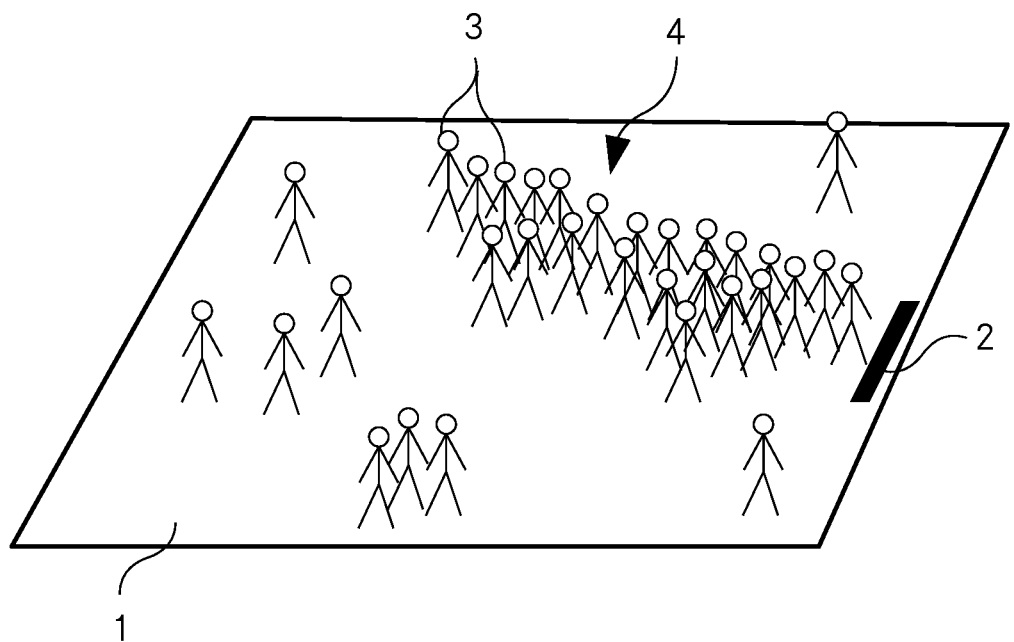
FIG. 1 shows a symbolic illustration of a distribution of persons in a monitoring region.
Figure 3:
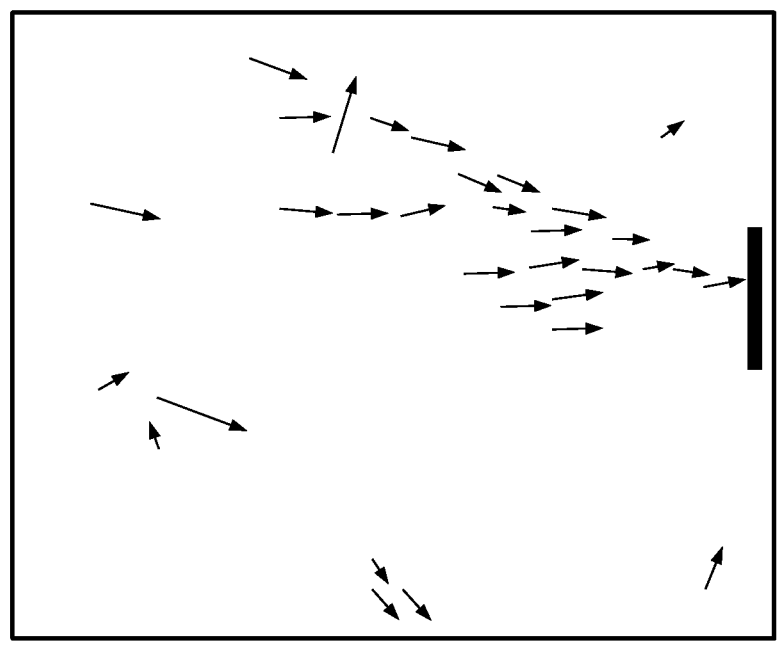
FIG. 3 shows a speed map illustrating the average vectorial speeds of the individual persons.

A method according to the invention is explained with reference to FIGS. 1-8. FIG. 1 is a symbolic illustration of a distribution of persons in a monitoring region. In the simplified example illustrated, the monitoring region 1 has a rectangular shape and has an exit region 2, e.g. a counter, which is arranged at an edge of the monitoring region 1. A number of persons 3 are situated in the monitoring region 1, including those who are queuing in front of the exit region 2, and others who are present in the monitoring region 1 for other reasons.

The queuing persons form a queue 4. Since there are no markings or boundaries present which would define the shape of the queue 4, its shape has formed in a fundamentally unforeseeable manner. However, the members of the queue 4 are situated in a substantially continuous zone, and the end position of the queue, i.e. the target of those waiting is known (namely the exit region 2). Such a queue, as already explained further above, is referred to as a "free queue".

The method according to the invention then serves for automatically detecting and analyzing the free queue on the basis of position information. It consists of two main elements, namely:

1. determining the spatial extent of the free queue and
2. analyzing the distribution of objects in the free queue.

Figure 2:
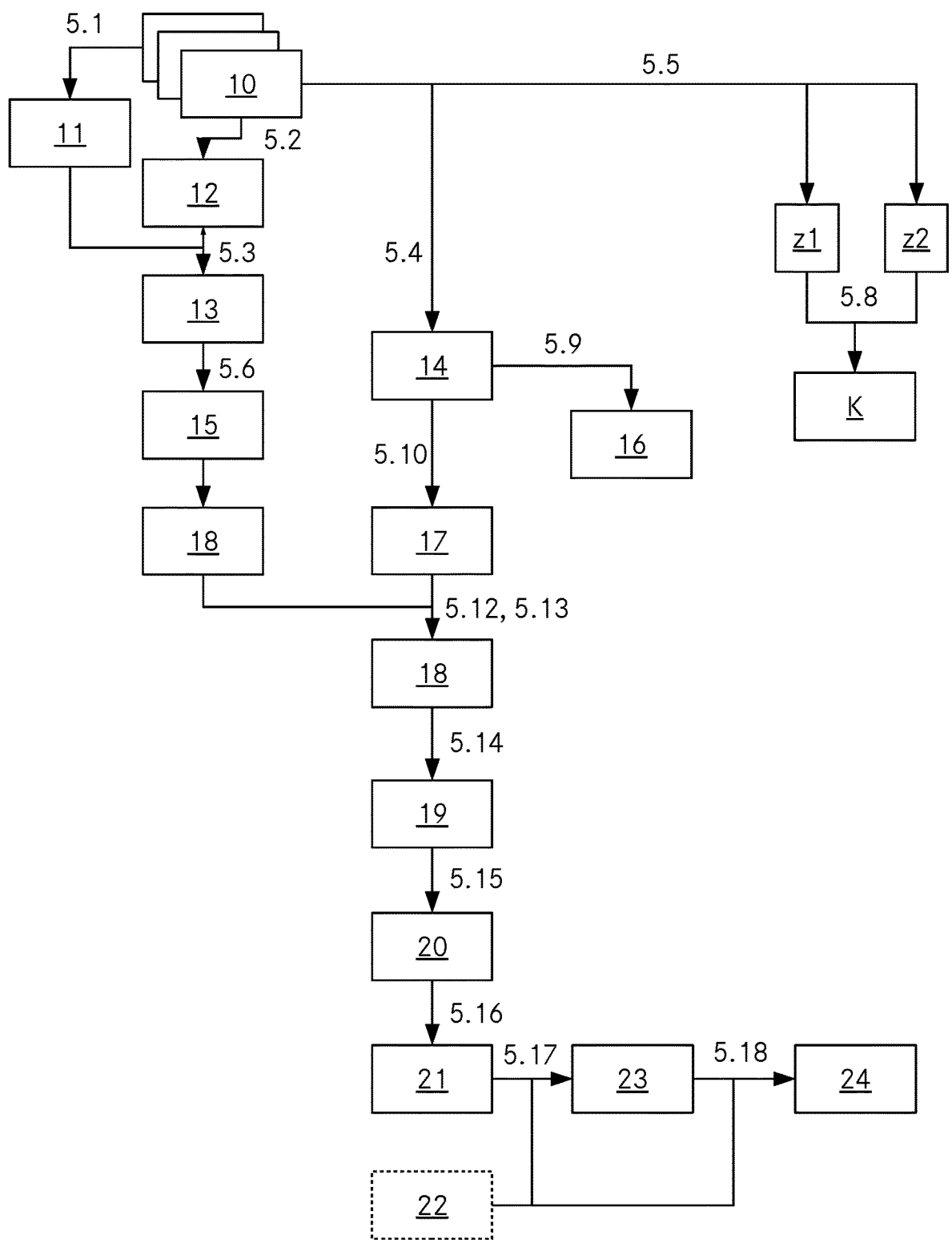
FIG. 2 shows a data flowchart of the method for detecting a free queue.
Figure 4:
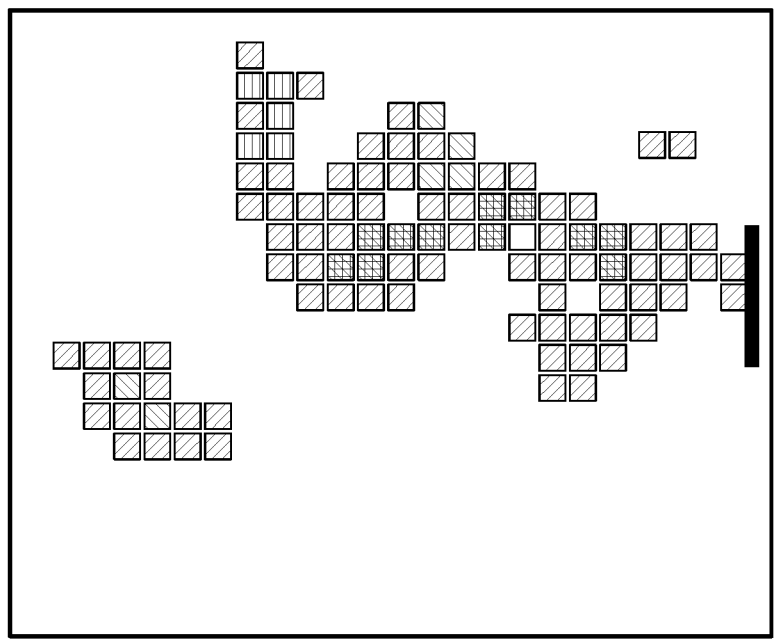
FIG. 4 shows an occupancy map that records positions occupied by persons whose speed does not exceed a certain threshold value.

Both main elements comprise a plurality of subfunctions which are mutually dependent on one another. A simplified data flowchart concerning the first main element is illustrated in FIG. 2.

The situation illustrated in FIG. 1 is firstly detected by an image sensor, e.g. by one camera or a plurality of cameras arranged above the monitoring region, by ultrasonic or infrared sensors or other sensors that can detect positions of persons. The image acquisition is carried out periodically, with continual generation of new frames 10 that in each case depict the current situation. The image information corresponding to the frames is preprocessed in the image sensor and then fed to a processing device. The preprocessing or the first processing in the processing device comprises, in a manner known per se, the step of identifying individual objects (persons) and the assignment of a unique identifier, such that the persons can then be tracked in an individualized manner.

The following steps are then carried out for each frame:

1. At regular time intervals, e.g. every half a second, corresponding in each case to a "step": store the positions of all persons in the monitoring region in a data structure 11, which includes all preceding n positions per person (step 5.1).
2. With the aid of the data structure, a check is then made to establish how many steps (=10 frames) a person required to cover a specific distance. The average speed over the last frames is ascertained as a result. If said average speed is higher than a certain threshold, the person is classified as too fast for a queue (e.g. someone who passes by the queue in proximity thereto or transversely through the queue). The set 12 of remaining persons is processed further (step 5.2). If the person is on the move too rapidly, the person is not taken into account for the subsequent steps.
3. Next, the direction and the speed of all persons already present in the previous step are determined. A direction vector thus results for each person (step 5.3, data 13). This is illustrated schematically in FIG. 3.
4. In a first map 14, which represents the monitoring region in scaled down size, all fields are incremented which are covered by any person who is not too fast (step 5.4). The first map is illustrated schematically in FIG. 4. The different hatchings represent different values of the individual fields.
5. If a detected queue is already present, indicators for the assessment of the movement within the queue are generated as follows (step 5.5):

5.1 A first counter $z1$, is incremented per person and per field covered by said person, under the assumption that the person is situated in the queue.

5.2 A second counter $z2$ is incremented per person and per field covered by said person, if the person had not already occupied the current position thereof once, under the assumption that the person is situated in the queue.

The counter readings are used at a later point in time, as explained further below.

Figure 5:
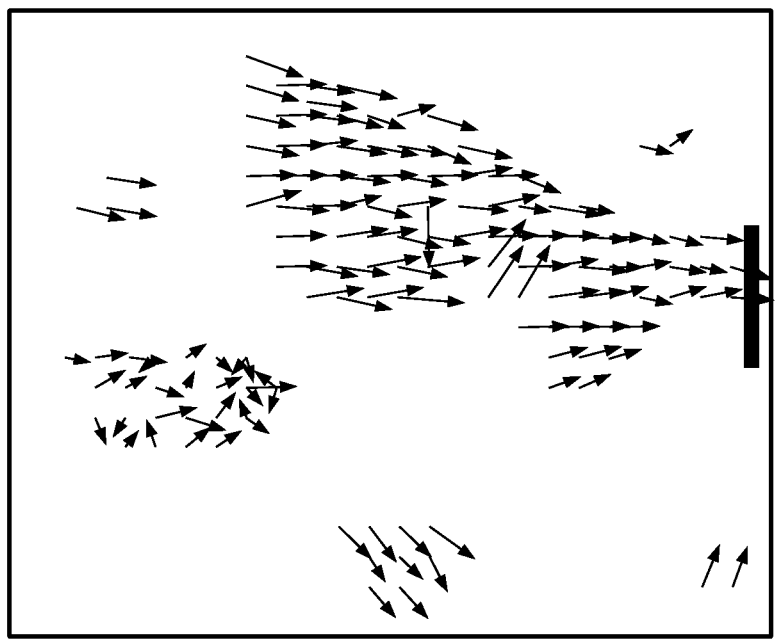
FIG. 5 shows a speed map that records the average vectorial speeds at the individual positions.

6. The last n person direction vectors of each field are stored (step 5.6) in a second map 15, which has the same size as the first map. All direction vectors of those persons who had already been taken into account in the establishment of the first map and moreover did not stand still between the last frame and the current frame are stored. Fields in said map which have no longer been traversed by a person for a relatively long time are reset after a defined time since the validity of the corresponding direction vectors would be inadequate. A corresponding map is illustrated in FIG. 5.
7. Steps 4 and 5 are repeated for all points on the current direction vector of each person who had already been taken into account in the establishment of the first map. That is to say that the steps are repeated for those fields of the first map which are touched by the direction vector, that is to say which lie between the beginning and the end of the direction vector. In this regard, all fields which the person entered or covered between the last frame and the current frame are taken into account; the map is thereby updated on the complete trajectories.

A continuous region that masks the imaging of the queue in the monitoring region (ROI, region of interest) is generated periodically at predefined time intervals. For this purpose, the following steps are performed:

8. A characteristic figure for assessing the intensity of movement within the preceding period in the queue is calculated from the counter values $z1$ and $z2$. The characteristic figure K is the ratio $z2/z1$ (step 5.8).
9. A stop mask 16 is generated, which masks regions which, with a high degree of certainty, do not belong to the queue (no activity in the entire period, all 0 fields in the first map, step 5.9).
10. A temporary "appearance map" 17 is generated by Gaussian filtering of the first map (step 5.10). It represents the activity or appearance density of persons in the preceding period.

Figure 6:
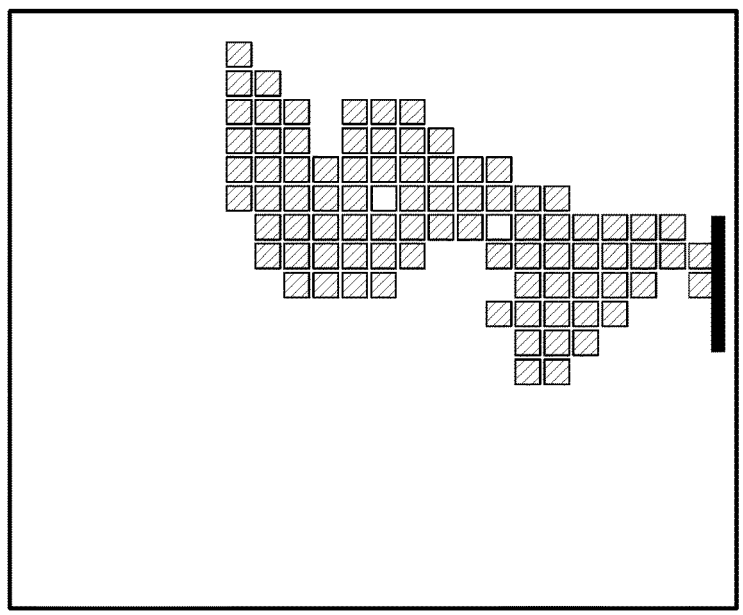
FIG. 6 shows the occupancy map after a flood fill process has been carried out.

11. Then, from the second map, the average direction vectors per field during the preceding period are ascertained and trajectories 18 that occurred often in the preceding period are generated therefrom (step 5.11). The trajectories 18 correspond to the average direction vectors. In order to obtain this average, the median of all X-coordinates and/or of all Y-coordinates of the direction vectors stored on a specific field of the second map is ascertained. A further map is produced therefrom, said further map indicating for each field where the average direction vector on said field points to. The trajectory results from the concatenation of a plurality of such direction vectors.
12. The appearance map 17 is filtered (again) together with the insights from the trajectories 18. For this purpose, along the trajectory of each field which belongs to one of the frequently occurring trajectories, a predefined number of values from the appearance map are collected and averaged (step 5.12). The trajectories ascertained are used wherever there is a minimum value present on the temporary appearance map ascertained in step 10. For each field which exceeds said minimum value, the average trajectory of this field is tracked. Along this trajectory, i.e. for all fields which lie on the trajectory, the corresponding maximally n values from the appearance map are stored. From all these values, once again the median is then ascertained as average value. These average values are stored in the filtered appearance map.
13. In order to generate the definitive appearance map 18, each field then obtains a value which corresponds to the maximum from the corresponding value in the appearance map present and the averaged value just determined in the corresponding field (step 5.13). In this way, in particular holes in the appearance map can be closed, and the main path of the queue is specially weighted.
14. In order to ascertain all possible ROIs 19 which intersect the defined exit region 2, a flood fill process is carried out, which successively uses all points of the exit region as a starting point if the corresponding point had not already been reached in a previous flood fill step. The validity function of flood fill checks the respective neighboring fields for a minimum value in the definitive appearance map and an absence in the stop mask (step 5.14).
15. The ROI 20 to be used further is then determined: if at least one ROI 19 was ascertained in the preceding step 5.14, then the ROI having the largest area is used. Otherwise a minimal ROI is used which comprises the region directly in front of the defined exit region 2 (step 5.15).
16. The following morphological operations are then carried out on the ROI 20 in order to obtain a closed, slightly extended, gap-free ROI 21 (step 5.16):
    a. Binary fill holes
    b. Dilate
    c. Closing
    d. Binary fill holes
17. A check is then made to establish whether the characteristic figure K is below a specific lower limit value, which would indicate a very small movement within the queue. Since gaps in the appearance map are probable in this case and flood fill would thereby ascertain only a segment of the desired ROI, in this case the previous ROI 22 from the preceding period is combined with the newly generated ROI 21 (step 5.17). A new ROI 23 results.
18. If the area, that is to say the number of fields of the new ROI, is less than that of the previous ROI multiplied by a defined factor f, 0<f<1, this indicates an unrealistic decrease within a period, for example as a result of a complete partial region of the queue standing still during the entire period. If this case has not already applied a predefined number of times in succession, e.g. three times in succession, the previous ROI 22 from the preceding period is used and the newly ascertained ROI is rejected (step 5.18). After three periods it should be assumed that the decrease actually occurred, e.g. because a new exit region was opened up, for which reason the newly ascertained ROI is then used. This results in a definitive ROI 24 as illustrated in FIG. 6.
19. Finally, the first map respectively representing the activity in a period is reset.

After the queue region (ROI) has been ascertained, the free queue can be analyzed. For this purpose, a map is created which covers the ROI and represents a binning of the average waiting time per field in the preceding period, that is to say how long persons who were situated in a specific field had already been waiting on average. The binning in bins of a size of 10 seconds, for example, results in a map comprising regions arranged sequentially along the queue. This is useful for the definition of the neighborhood within the queue and for defining the start of the queue.

Figure 7:
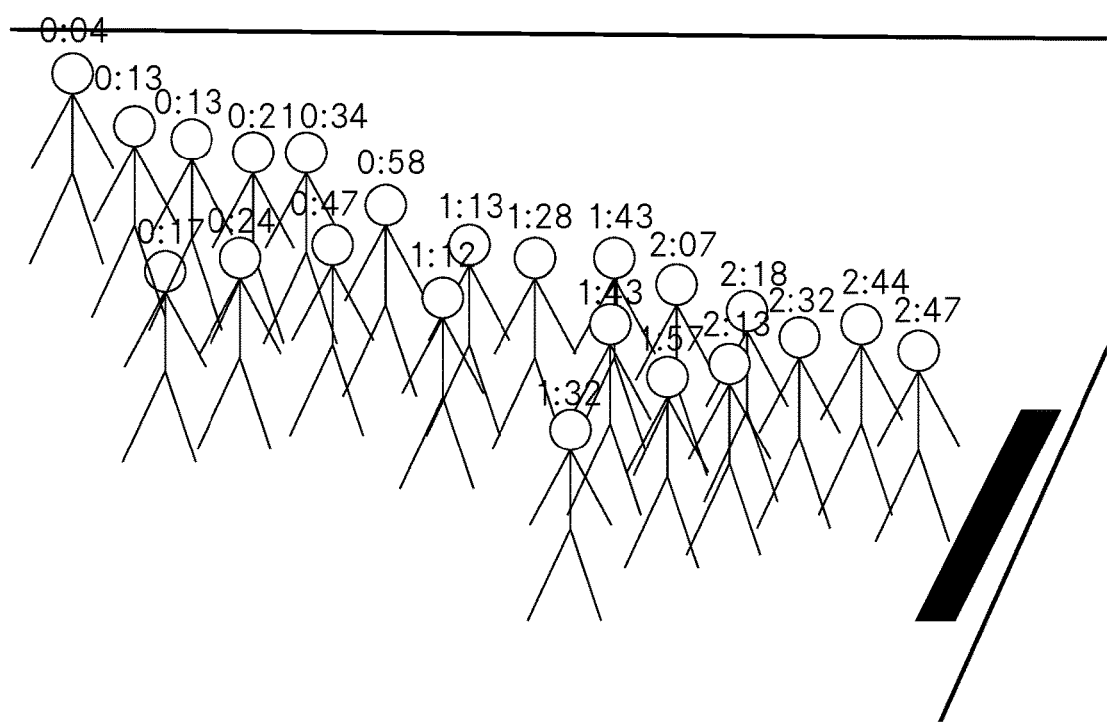
FIG. 7 shows a symbolic illustration of a distribution of persons in a monitoring region with assigned waiting times.
Figure 8A:
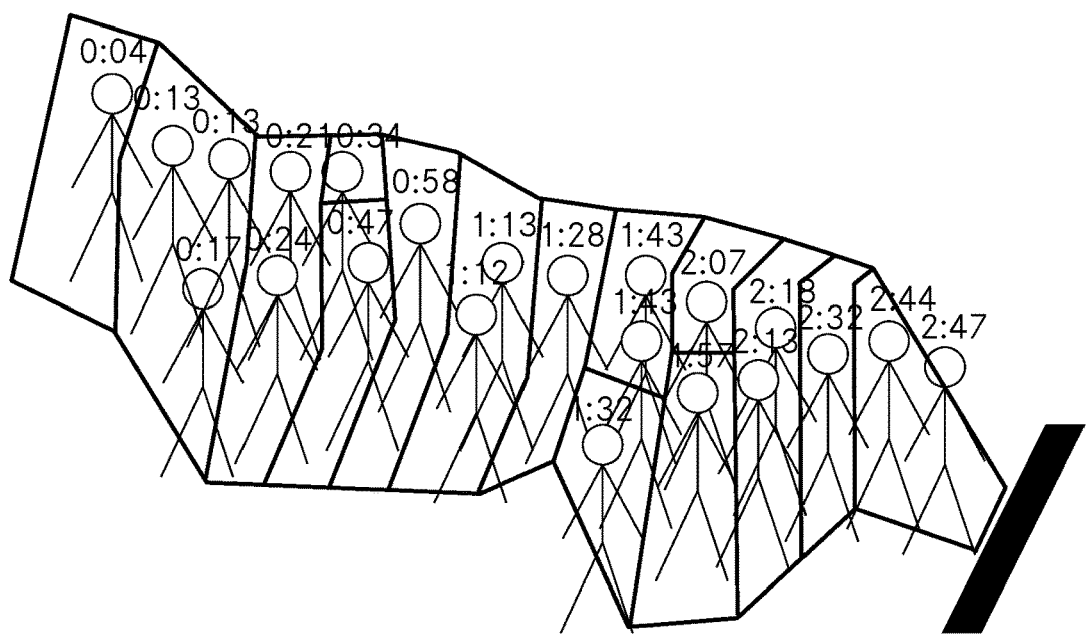
FIGS. 8A, B show a waiting time map with a division of an extent zone of the free queue into waiting time classes.
Figure 8B:
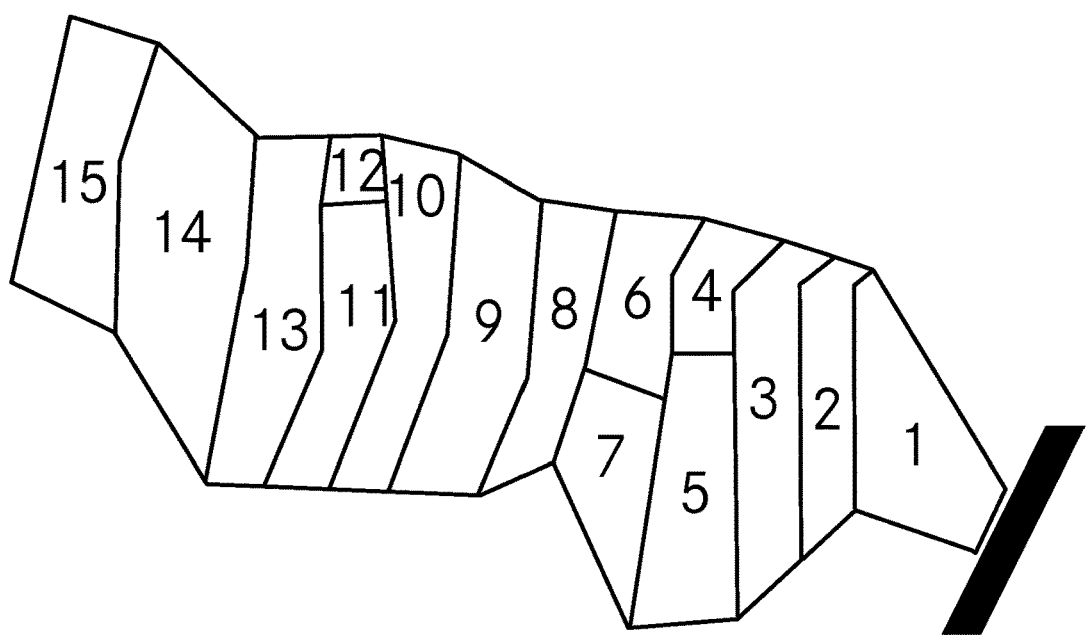

The following steps are carried out for each frame:
1. In a map having the same resolution as the first map mentioned above, per field assigned to the queue to be analyzed, the waiting times of the last n persons who were situated on the field (or covered the latter) are stored.
2. Persons newly included in the analysis or persons not yet assigned a waiting time, that is to say persons not recorded in the map just mentioned, initially have the status "non-validated". A temporary path is administered for all non-validated persons. Said temporary path stores positions of the person together with the waiting times that the person has at the respective position. In addition, the point in time at which the respective position was last stored is also stored.
3. As soon as a person acquires the status "validated", that is to say is recorded in the map mentioned in the step before last, all temporarily stored waiting times of the validated person are added to said map at the corresponding positions, under the assumption that the point in time of storage of the position is not longer ago than a predefined temporal distance (whereby the tracking information would be inadequately up to date).
4. If a person is indeed validated, but had to be corrected in terms of the waiting time thereof (see below), the path is rejected, i.e. the temporarily stored data do not influence the map.
5. The path is likewise rejected if the point in time of the last presence within the queue region is longer ago than a predefined temporal distance.
6. The waiting time of persons who are already validated is added at the current position thereof directly to the map mentioned in step 1. Temporary storage is not necessary in this case. If the map already includes an entry of this person at the same position, the already stored waiting time of the person is overwritten. FIG. 7 shows a schematic illustration of the persons assigned to the queue with the calculated waiting times.

Furthermore, the following steps are carried out periodically at predefined time intervals.
7. A classified map is generated from the map from step 1 per period. Said classified map represents the average waiting time at a specific position as a bin. In this case, a bin comprises 10 seconds. Each bin is provided with an identification number, ascending from the end of the queue to the start thereof. The map is illustrated schematically in FIGS. 8A, B. Since only values originating from persons having reliable (valid) past waiting times have an influence for the average waiting time, said classified map reflects a continuously proceeding, increasing waiting time pattern from the start of the queue to the end (near the defined exit region). Said map forms a robust basis for finding the neighborhoods within the queue. Persons who are situated in the same bin (or in adjoining bins) at a specific point in time are adjacent with very high probability.

8. The identification number of that bin which corresponds to the shortest waiting time is stored. Said number is used to identify the start of the queue.

Analyses can then be performed on the basis of the data acquired. When determining the waiting time of persons who have newly entered the queue, it is taken into account whether the person joined the queue regularly or whether the person (e.g. on account of a detection error) appeared directly within the queue. In addition, the entry location of the person is crucial (regularly at the start of the queue or somewhere along the queue).

The fact of whether a person is situated within a queue region or outside is stored for each frame. An IN/OUT counter can thus be operated per person. Said counter increments in each case k frames as soon as the location of a person has changed (within/outside the queue). If the IN/OUT counter exceeds a certain limit value, the person changes the previous association of said person with the queue. As a result, a kind of tolerance time is implemented regarding how long a person is permitted to change the location of said person before the association of said person is adapted. The adaptation of the association is intended not to occur, for example, if a person only passes through the queue, that is to say is situated only temporarily in the region of the queue.

For each person who enters the queue for the first time, the bin identification number of the entry location is stored. In addition, for each person the fact of whether the location of the initial appearance of said person already belonged to the queue or was situated outside is detected.

The persons within the queue can be examined with regard to an unusual movement (jostling or falling back) on the basis of their movement pattern. Persons who move unusually and thus experience a different waiting time than average members of the free queue are marked as "to be corrected". The following steps are carried out for this purpose:

1. The m nearest neighboring persons who are situated in front of the person under consideration and the m nearest persons who are situated behind the person to be considered are determined. For this purpose, the bin identification numbers and the waiting times of the further persons are compared with the corresponding indications of the person under consideration.
2. Next, the average waiting times of the m preceding and the m following persons are determined.
3. The difference between these two waiting times and the waiting time of the person under consideration is determined, and from this the temporal deviation of the two values relative to the corresponding values from the last evaluation. The difference values are stored; they will be required again in the next evaluation.
4. The average waiting time of the k persons who are situated nearest the person under consideration, that is to say whose bin identification numbers are closest to that of the person under consideration, is then determined; subsequently the number of bins between this average waiting time and that of the person under consideration.
5. If the two deviations from step 3 are above a certain threshold and the number of bins from step 4 also exceeds a certain threshold, a counter is incremented for the person under consideration. The value of said counter is an indicator of an unusual movement since, if the thresholds mentioned are exceeded, the environment of the person under consideration appears to have changed significantly in comparison with the preceding evaluation, which indicates that the person has moved e.g. too slowly or too rapidly in the queue or, for a different reason, has a no longer credible waiting time for the queue region in which said person is currently situated.
6. If the conditions in point 5 are met, the temporary path is additionally rejected (see above).
7. If the conditions in point 5 are not met, the counter mentioned in point 5 is reset to zero.
8. If the counter exceeds a certain predefined value (e.g. 3), this shows that the person under consideration has had a greatly deviating environment a number of times in succession. In this case, the person is marked as "to be corrected".

The waiting time of "persons to be corrected" and of persons who have newly (for the first time) entered the queue is then determined. In the case of persons situated in the queue for the first time, the fact of whether the person joined the queue regularly or whether the person appeared directly within the queue (e.g. on account of a detection error) is taken into account in this case. In addition, the entry location of the person is crucial (regularly at the start of the queue or somewhere along the queue). To that end, the following steps are carried out for each person who either has newly entered the queue or is marked as "to be corrected":

1. Firstly, the difference between the bin identification number of the current whereabouts of said person and the maximum bin identification number within the queue (corresponding to the start of the queue) is determined.
2. Furthermore, the difference between the bin identification number of the location of said person's first entry in the queue and the maximum bin identification number is determined.
3. A check is then made to ascertain whether one of the two values from steps 1 and 2 is below a specific threshold. This threshold corresponds to the number of bins which are intended to be regarded as associated with the start of the queue. The check is likewise made to ascertain whether the person did not appear within the queue for the first time.
4. If both conditions from step 3 are met, the person is classified as a person who entered the queue regularly, and maintains the previous waiting time of said person. Therefore, no correction is carried out.
5. If one of the two conditions from step 3 is not met, that is to say if the person is not present in the vicinity of the start of the queue or did not enter the queue for the first time there or appeared directly within the queue, a new, corrected waiting time is assigned to this person. In order to determine this corrected waiting time, the k nearest persons are used and the waiting time thereof is averaged in each case by means of median or arithmetic mean. If k persons cannot be found who are situated near enough to the person to be corrected and whose status is simultaneously validated, the assignment of the corrected waiting time is deferred for the time being. A new attempt is made in the context of the next evaluation.

To summarize, it can be stated that the invention provides methods for analyzing the distribution of objects in a free queue and for determining the spatial extent of a free queue which enable an efficient analysis of free queues and yield precise results.

The invention claimed is:

1. Method for analyzing the distribution of persons in a free queue, proceeding from rasterized image information, comprising:
   receiving, at predefined time intervals, frames of rasterized image data from at least one image sensor positioned above a monitored region;
   for each received frame of rasterized image data, causing a processor to:
   a) subdivide a monitoring region comprising the free queue into a plurality of positions;
   b) identify, from the rasterized image data, persons assigned to the free queue;
   c) track the identified persons;
   d) track, for at least a portion of the identified persons, a current waiting time in the free queue;
   e) assign, to at least a portion of the positions of the monitoring region, the current waiting time of one or a plurality of the identified persons situated at the corresponding positions; and
   f) classify the positions with assigned current waiting times into a plurality of classes, wherein each of the classes corresponds to a continuous waiting time range,
   wherein the current waiting times of a plurality of persons situated at the positions during a monitoring time period are averaged before the positions are classified into classes.

2. Method according to claim 1, whereby, a binning of the waiting times is performed, resulting in a map for the free queue, the map representing individual sub-regions in an ascending manner in a mosaic-like manner along the direction of the queue.

3. Method according to claim 2, wherein waiting times of a predefinable number of persons who were last situated at the specific position are taken into account for the averaging.

4. Method according to claim 1, wherein positions of a non-empty class to which the shortest waiting time is assigned are defined as the start of the free queue.

5. Method according to claim 1, wherein the processor is further caused to:
   a) assign newly identified persons to a first object group;
   b) store, for each of the persons of the first object group, a sequence of positions of the person with assigned waiting times;
   c) periodically check, for all persons of the first object group, Nether the persons satisfy a validity criterion;
   d) assign all checked persons that satisfy the validity criterion to a second object group and add at least a portion of the sequence stored for these persons to the waiting times assigned to the positions in step e),
   wherein an assignment of the current waiting time in accordance with step e) is carried out only for the persons in the second object group.

6. Method according to claim 1, further comprising determining the spatial extent of a free queue, proceeding from rasterized image data in the received frames, by causing a processor to:
   a) periodically store a current position of at least a portion of the tracked persons;
   b) determine an average speed of at least a portion of the persons, wherein the average speed of a person is determined on the basis of a plurality of the stored positions of the respective person;
   c) create, depending on the determined average speeds, a first map, which records, in relation to the positions in the monitoring region, an appearance density of persons at the corresponding positions,
   d) carry out, proceeding from a predefined exit region of the free queue, a flood fill method for generating a continuous region corresponding to the extent of the free queue, wherein the first map is used for a validity check.

7. Method according to claim 6, wherein persons having an average speed outside a predefined range are not taken into account when creating the first map.

8. Method according to claim 6, wherein the processor is further configured to:
   a) determine a direction vector of at least a portion of the persons, wherein the direction vector of a person is determined on the basis of a plurality of the stored positions of the respective persons;
   b) create a second map, which records the determined direction vectors of the persons in relation to the positions in the monitoring region;
   c) determine, for each field of the second map, an average direction vector;
   d) identify, on the basis of the determined average direction vectors, frequent: trajectories during a predefined past period;
   e) supplement, for at least some of the identified frequent trajectories, information in the first map, concerning the appearance density of persons at positions which are associated with the trajectories.

9. Method according to claim 6, wherein a stop mask comprising positions without activity is generated proceeding from the first map, and in that the stop mask is used for the validity check in the flood fill method.

10. Method according to claim 6, wherein the first map is smoothed before the flood fill method is carried out, in particular by Gaussian filtering.

11. Method according to claim 6, wherein the flood fill method is carried out for all positions of the exit region, such that a plurality of continuous regions can be generated, and in that a region having the largest area is selected as the extent of the free queue.

12. Method according to claim 6, wherein the continuous region is processed further by at least one morphological operation selected from the group consisting of filling isolated holes in a continuous region, dilatation, and closing.

13. Method according to claim 6, wherein a characteristic figure is generated for a movement in the free queue, wherein the continuous region ascertained is combined with a continuous region ascertained at an earlier point in time if the characteristic figure indicates a small movement.

14. Method according to claim 2, wherein waiting times of those persons who were situated at the specific position during a predefinable period of time before an evaluation point in time are taken into account for the averaging.

* * * * *